US011436485B2

(12) United States Patent
Iannone

(10) Patent No.: US 11,436,485 B2
(45) Date of Patent: *Sep. 6, 2022

(54) METHOD FOR PERFORMING DIAGNOSTICS OF A STRUCTURE SUBJECT TO LOADS BASED ON THE MEASUREMENT OF DISPLACEMENTS AND SYSTEM FOR IMPLEMENTING SAID METHOD

(71) Applicant: LEONARDO S.p.A., Rome (IT)

(72) Inventor: Michele Iannone, Torre Annunziata (IT)

(73) Assignee: LEONARDO S.p.A., Rome (IT)

( * ) Notice: Subject to any disclaimer, the term of this patent is extended or adjusted under 35 U.S.C. 154(b) by 702 days.

This patent is subject to a terminal disclaimer.

(21) Appl. No.: 16/443,995

(22) Filed: Jun. 18, 2019

(65) Prior Publication Data

US 2019/0392313 A1 Dec. 26, 2019

(30) Foreign Application Priority Data

Jun. 20, 2018 (IT) ........................ 102018000006499

(51) Int. Cl.
*G06N 3/08* (2006.01)
*B64F 5/60* (2017.01)
(Continued)

(52) U.S. Cl.
CPC ................. *G06N 3/08* (2013.01); *B64F 5/60* (2017.01); *G06F 17/15* (2013.01); *G06K 9/6256* (2013.01)

(58) Field of Classification Search
CPC ........ B64F 5/60; G01M 5/0041; G06F 17/15; G06K 9/6256; G06N 3/08
See application file for complete search history.

(56) References Cited

U.S. PATENT DOCUMENTS

2007/0006652 A1* 1/2007 Weldon, Jr. ........ G01G 23/3728
73/579
2016/0039527 A1* 2/2016 Goto ........................ B64C 1/20
248/214
(Continued)

FOREIGN PATENT DOCUMENTS

EP 2682836 A2 10/2014

OTHER PUBLICATIONS

A S Islam, "Damage detection in composite structures using piezo-electric materials (and neural net)," Jun. 24, 1994, Smart Materials and Structures, vol. 3, No. 3,1994 Smart Mater. Struct. 3 318, pp. 318-327.*

(Continued)

*Primary Examiner* — Omar S Ismail
(74) *Attorney, Agent, or Firm* — ArentFox Schiff LLP; Michael Fainberg

(57) ABSTRACT

A method for performing diagnostics of a structure subject to loads, in particular an aircraft structure, is described, said method being implemented by means of an arrangement of sensors located at relevant points of the structure and corresponding neural networks, and comprising: training the neural network in order to establish an associative relationship between the local displacement of the structure in a subset of relevant points and the local displacement of the structure in at least one residual relevant point; detecting the local displacement of the structure in a plurality of relevant points under operating conditions; estimating the local displacement of the structure in at least one residual relevant point by means of the associated neural network on the basis of the pre-established associated relationship; and comparing the local displacement of the estimated structure with the detected local displacement at the residual relevant point.

16 Claims, 4 Drawing Sheets

(51) Int. Cl.
*G06F 17/15* (2006.01)
*G06K 9/62* (2022.01)

(56) References Cited

U.S. PATENT DOCUMENTS

| | | | |
|---|---|---|---|
| 2017/0331844 A1* | 11/2017 | Harrigan | G06N 20/00 |
| 2018/0354630 A1* | 12/2018 | Nakhjavani | G06N 3/084 |
| 2018/0362190 A1* | 12/2018 | Chambers | B64D 45/00 |
| 2019/0265714 A1* | 8/2019 | Ball | G06N 3/0454 |

OTHER PUBLICATIONS

Ajay Kesavan,"Embedded Intelligence in Structural Health Monitoring Using Artificial Neural Networks,"Aug. 21, 2006,Doctor of Philosophy (PhD), RMIT University; 2006,pp. 10-20,68-78,101-110.*

Raffaella Di Sante,"Fibre Optic Sensors for Structural Health Monitoring of Aircraft Composite Structures: Recent Advances and Applications,"Jul. 30, 2015,Sensors 2015, 15, 18666-18713; doi:10.3390/s150818666,pp. 18667-18701.*

Lin Niu,"Monitoring of a Frame Structure Model for Damage Identification using Artificial Neural Networks,"Sep. 2012,2nd International Conference on Electronic & Mechanical Engineering and Information Technology (EMEIT-2012), pp. 0438-0440.*

Chi Tran,"Structural-damage detection with big data using parallel computing based on MPSoC," Nov. 11, 2015,Int. J. Mach. Learn. & Cyber. (2016) 7:1213-1223,pp. 1213-1220.*

* cited by examiner

METHOD FOR PERFORMING DIAGNOSTICS OF A STRUCTURE SUBJECT TO LOADS BASED ON THE MEASUREMENT OF DISPLACEMENTS AND SYSTEM FOR IMPLEMENTING SAID METHOD

CROSS-REFERENCE TO RELATED APPLICATIONS

This application claims priority to Italian Patent Application No. 102018000006499 filed on Jun. 20, 2018. the entire contents of which is hereby incorporated in its entirety by reference.

FIELD OF THE INVENTION

The present invention relates in general to a method for performing structural diagnostics, and more specifically to a method for performing diagnostics of a mechanical structure, in particular an aircraft structure, suitable for evaluating or monitoring the presence of damage or defects caused in a structure by operating loads and/or events occurring while in service.

BACKGROUND OF THE INVENTION

In methods for carrying out the maintenance of systems (parts of products or complex products) it is of particular interest to be able to reduce unexpected faults by monitoring certain parameters indicating the state of the system.

According to the prior art, in the aeronautical sector the presence of damage or defects in a mechanical structure of an aircraft, such as a metal or composite structure, for example fuselage or wing structure, is diagnosed indirectly by means of a historical reconstruction of events, including events which have resulted in damage due to an accidental impact during production (impact of a tool) or while in service (impact due to hail or foreign objects), and loads withstood by the structure, or by means of estimate of the fatigue withstood by the structure, based on the knowledge of its mechanical strength properties in response to the stresses which typically occur in service conditions. In particular, in the case of composite structures, accidental impacts produce effects which are not very visible externally but may cause considerable damage inside the structure (for example, delamination).

This technique, however, is laborious and imprecise, because it does not reflect in real time the changes and the physical and mechanical conditions of the monitored structure.

A method for predicting the behavior of a structure subject to loads was developed by the same Applicant and described in the European patent application EP 2,281,224 A1. The method comprises the provision of a mathematical model of the structure, detection of the state (deformation) of the structure in a plurality of primary points and in a plurality of additional points, determination of the loads acting on the structure and associated with the state detected in the primary points on the basis of the aforementioned mathematical model, estimation, using the loads determined, of the state of the structure in the additional points, and comparison between the state of the structure estimated and that detected in the additional points, so that an intact state of the structure is determined if the estimated and detected values of the state parameter match, or a defective state of the structure if these values differ.

EP 2,682,836 by the same Applicant relates to a method for performing diagnostics of a structure subjected to loads, based on the association with said structure of a sensor arrangement adapted to reveal at least one state of the structure. The method comprises the learning of an associative relationship between the values assumed by an indicative parameter of the state of the structure in a subset of a plurality of relevant detection points of the state of the structure and the values of the state parameter in at least one residual relevant detection point, starting from a plurality of indicative training data of the state of the structure in association with at least one load condition. In an operational phase, the method for performing diagnostics consists of detecting the values assumed by the indicative parameter of the state of the structure in a plurality of relevant detection points under at least one load condition, on the basis of the predetermined association relationship and from the values assumed by the state parameter of the structure in a subset of the plurality of detection points, estimating the values of the state parameter at residual detection points, and finally comparing the estimated and detected values of the state parameter in the residual detection points. An intact state of the structure is determined if the expected and detected values of the state parameter match, whereas a defective state of the structure is determined if the values of the state parameter differ. EP 2,682,836 describes—as a representation of the state of the structure—the deformation thereof.

The object of the present invention is to provide an improved alternative method for performing structural diagnostics, which is both simple and flexible and allows the physical and mechanical conditions of a structure to be estimated with continuity in a reliable manner.

A further object of the invention is to provide a method for performing diagnostics which can be applied without the need for excessive calculation and in particular without the need to create a physical/mathematical model of the structure and which can therefore be implemented on-board an aircraft also when in service or during a mission.

SUMMARY OF THE INVENTION

According to the present invention these objects are achieved by means of a method of performing diagnostics on a mechanical structure having the characteristic features defined in Claim 1.

Particular embodiments form the subject of the dependent claims, the contents of which are to be understood as forming an integral or complementary part of the present description.

The invention also relates to a system and a computer program for performing the diagnostics of a mechanical structure as claimed.

In short, the present invention is based on the characterization of a mechanical structure under examination which is subject to operating loads able to cause local displacements of points of the structure with respect to a reference system (i.e. to modify the local position of points of the structure with respect to a reference system), and on the correlation in real time of real displacement data (i.e. of the data indicative of the real variation of the position of prechosen points) and presumed displacement data (i.e. of the presumed variation of the position of prechosen points), a comparison thereof being used to deduce the intact or defective condition of the structure.

Hereinafter in the present treatment, "displacement" means the variation of a spatial position of an element under examination, such as a relevant point of the structure, that is, of the indicative coordinates of said position. If the coordinates of a point before the displacement are indicated x0, y0, z0, and the coordinates of the point after the displacement are indicated x1, y1, z1, the displacement is a vector of components (x1-x0), (y1-y0), (z1-z0). More generally, the displacement of a point $P_i$ of a body between an instant to and an instant $t_1$ is defined as the vector $P_i(t_0)-P_i(t_1)$, and is characterized by a magnitude having length dimension, by an orientation and by a sense, i.e., by three coordinates of scalar length dimension. The reference system may be either fixed or integral to the structure to which the point belongs.

Displacement is conceptually and dimensionally different from deformation, described in EP 2,682,836, which is defined with reference to a segment of the structure, the original length $l_0$ of which varies due to the deformation of the structure until it reaches the length $l_1$, whereby if the difference between the two lengths is indicated $\Delta l$, the deformation is defined as $\varepsilon=\Delta l/l_0$ as $l_0$ trends to 0. As a result, the deformation is a dimensionless parameter (ratio of the lengths).

A defect of the structure may consist of a hole, a filled hole or other modifications to the surface or volume, for example caused by the insertion of a connection member, impact damage, delamination, porosity, or due to a zone of the structure which has a different resin or fiber intensity. A defect may be concentrated in a point with specific coordinates or spread out in a direction or over an area or within a volume of the structure.

In a currently preferred embodiment, the structure being examined is equipped with a limited number of displacement sensors or meters located in relevant points, such as mechanical displacement transducers or transducers operating according to optical or interferometric techniques.

Unlike structural deformation measurement techniques, whereby sensors locally integral to the structure are used to associate the value of the structural deformation with a physical property of the sensor, such as electrical resistance (strain gages) or interference wavelength (fiber optics with Bragg grating), displacement measurement methods are more easily automated.

It should be noted that, depending on the prechosen arrangement of relevant points (or detection points) on the structure a possible concentrated defect, located far from them, may not cause any variation in the state of the structure at the relevant points, so that a given load or vector of loads gives rise to a displacement vector which is unchanged in the presence of a defect. Obviously, the criterion for choosing the detection points must preferably take into account the sensitivity to the structural defect at said points.

A neural network, the degree of complexity of which depends on the morphological complexity of the structure, is trained on the basis of the state conditions detected on the structure at the relevant points by means of association with at least one and preferably a plurality of different load conditions. The neural network is designed to estimate a correlation between the displacement or the variations in position detected in a subset of relevant points and the displacement or the variation in position in one or more residual relevant points.

A presumed variation in position of a relevant point of the structure under examination depending on a given operating load is estimated by means of the neural network which has been suitably trained and is compared with the corresponding real value of position measured by the sensor associated with the relevant point.

Advantageously, by means of the neural network, for each load situation an associative prediction of the displacement or modification of the position is assigned to a subset of relevant points and preferably to each relevant point of the complete set of relevant points on the basis of the displacement or modifications in the position detected at the other points of the set. Therefore, for each point and any load situation a comparison may be performed between the value of the displacement predicted by the neural network for that point and the real value of the displacement detected by the associated sensor, basically performing a comparison between the expected state of the structure and the detected state.

The diagnostic evaluation of the structure is performed by means of identification and signaling of the points where the displacement value assumed differs from the expected value by an amount greater than a predetermined tolerance threshold. An intact state of the structure is determined if the expected and detected displacement values match within the predetermined tolerance threshold, or a defective state of the structure is determined if these values differ beyond the predetermined tolerance threshold.

The diagnostic evaluation may be conveniently verified by considering a plurality of different load situations and therefore measurements of the presumed displacement of the relevant points of the structure, whereby the existence of a mismatch condition between values predicted by means of the neural network and values detected by the sensors in a plurality of load situations may be interpreted as a confirmation of the presence of damage or a defect in the structure, while the existence of a mismatch condition between values predicted by means of the neural network and values detected by the sensors in a single load situation or in a small number of load situations together with the existence of a match condition between values predicted by means of the neural network and values detected by the sensors in a multiplicity of different load situations may be interpreted as an occasional signal.

Mapping of the points wherein the presence of damage or a defect in the structure is estimated may be interpreted as a useful indication of the extent of the damage.

Advantageously, the method according to the invention does not require the construction of a complex model of the diagnostics structure, for example finite-elements model, as described in EP 2,281,224 A1.

In a further advantageous way, the method according to the invention allows a measurement density on a conceptually continuous structure, unlike known techniques based on the detection of deformations by means of strain gages, by necessity discrete, whereby very small dimensional defects may be detected.

BRIEF DESCRIPTION OF THE DRAWINGS

Further features and advantages of the invention will be described in greater detail in the following detailed description of an embodiment thereof, given by way of non-limiting example, with reference to the accompanying drawings wherein.

DETAILED DESCRIPTION OF A PREFERRED EMBODIMENT

Figure 1:
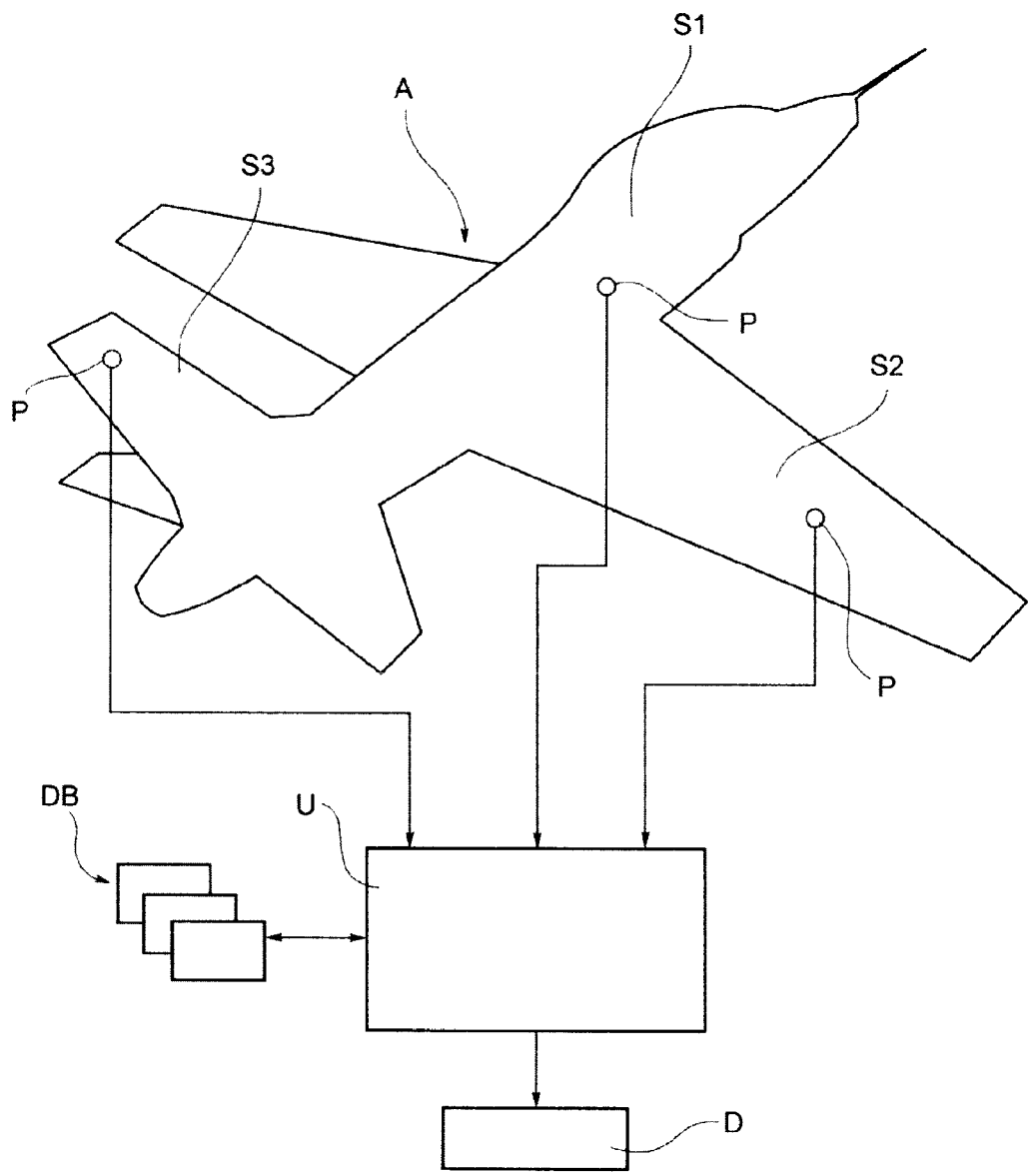
FIG. 1 shows an example of a diagnostics system according to the invention, applied to a vehicle.

An example of a structural diagnostics system in the preferred application to an aircraft is schematically shown in FIG. 1.

Said figure shows the aircraft, denoted overall by A, and some of its structural parts which are to be monitored with regard to their intact or defective condition, for example the fuselage S1, the wing structure S2 and the tail unit S3. A plurality of sensors or meters, denoted overall by P, are shown located on each part in N relevant detection points suitable for detecting a local displacement indicative of the state of the aircraft structures.

The sensors are connected to an electronic processing unit U to which respective signals representing the displacements detected are transmitted. A database DB is associated with the processing unit and is designed to store a plurality of vectors comprising the values assumed by the displacement detected at the N points in different load conditions. For operation of the system according to the invention, conveniently in a learning step during the first stage of operation of the diagnostics structure, a large number of vectors are recorded.

The processing unit U comprises a plurality of neural networks which are designed to process data with an approach of the associative type, and the number of vectors which are conveniently recorded during a learning step depends on the number of coefficients used by the neural networks described below, and preferably this number of vectors should be at least five times the number of coefficients.

For i-th point $P_i$, where P lies between 1 and N, a neural network is designed to determine a correlation between the values assumed by the displacement in the N-1 points different from the point $P_i$ and the value assumed by the displacement in the point $P_i$, depending on at least one and preferably a plurality of load conditions.

Figure 4:
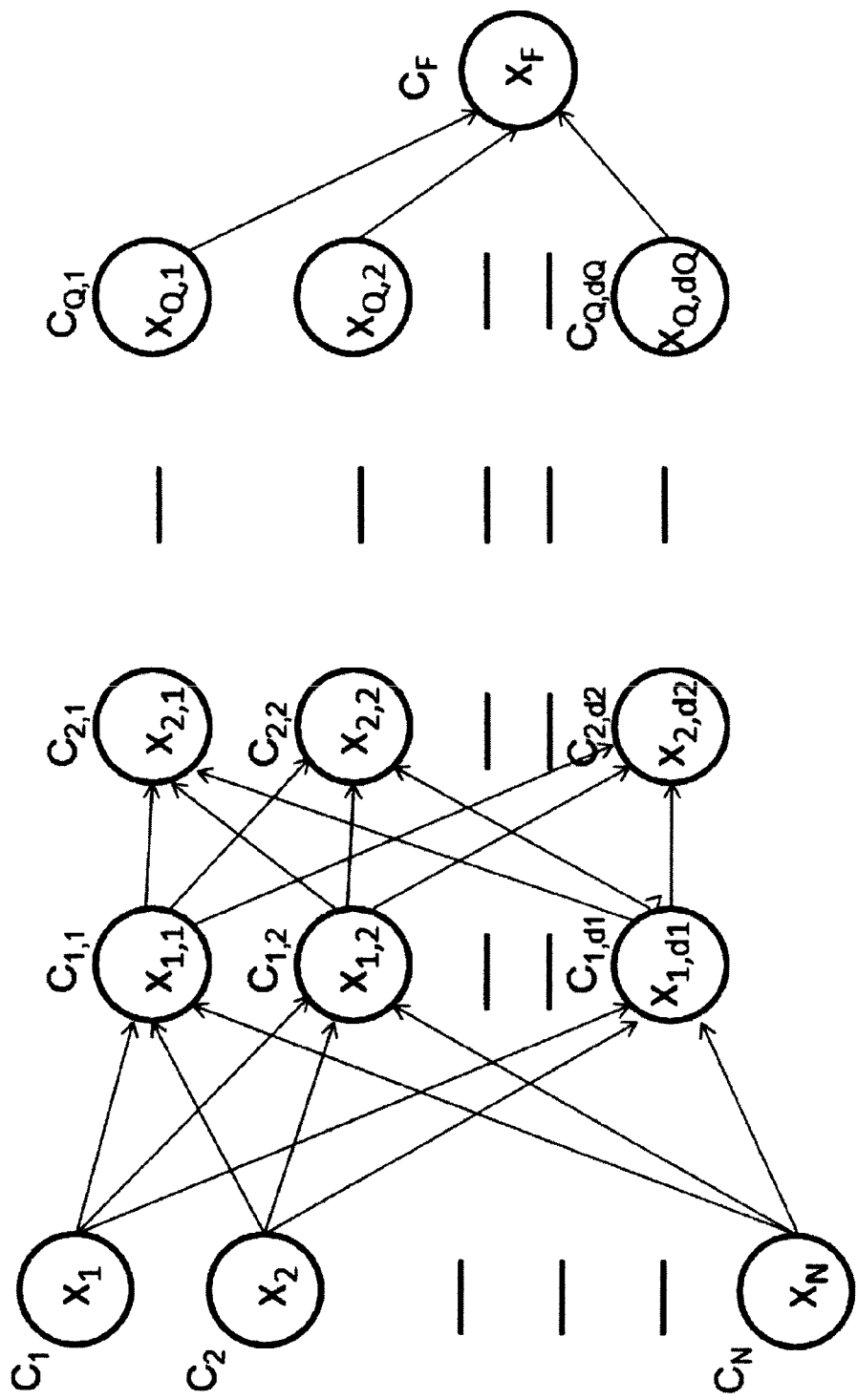
FIG. 4 is a diagram illustrating an example of a neural network according to the invention.

Each neural network is a network with Q levels, with $d_Q$ nodes per level, as shown in FIG. 4. By way of example, and with reference to the Figure, a correlation of the neural type established between N relevant points $X_1, X_2, \ldots, X_N$ at the input and a relevant point $X_F$ at the output is described.

First of all a neural box consisting of Q successive lines (for example 3), each with dimensions $d_1, d_2, \ldots, d_Q$ (for example 3 nodes per line) is established. The correlative logic flow is shown in the figure, so that each node contributes to all the nodes of the next level.

A respective correlation parameter C is defined for each relevant input point for each neuron (inner node) and for each relevant output point. A crossed correlation function $\phi$ is also established and associates with each pair of correlation parameters $C_a$, $C_b$ a crossed correlation parameter K, where $K_{a,b}=\phi(C_a, C_b)$. A function f (typically a hyperbolic function) is defined and, for each successive step, a correlation is established between the N relevant input points and the relevant output point of each calculation step indicated by $X_{i+1,j}=f((x_{i,1}, K_{(i,1),(i+1,j)}), (x_{i,2}, K_{(i,2),(i+1,j)}), \ldots, (x_{i,N}, K_{(i,N),(i+1,j)}))$.

This having been defined, training of the network, based on the availability of a sufficiently large number of real situations in which the displacement values of the relevant points upstream of the network and the corresponding displacement value of the relevant point downstream of the network are known, consists in defining the parameters C which minimize the difference between the output displacement value calculated by the function f and the optimized parameters C, and its real displacement value. Minimization may be performed, for example, using criteria of the "minimum squares" type.

By means of N neural networks which have been suitably trained, one for each relevant point, for each load situation wherein the displacements in N-1 points are detected, the processing unit is able to provide an associative prediction of the value of the displacement for the remaining point.

The processing unit is connected moreover to a signaling unit D for indicating to an operator, such as the aircraft pilot or a maintenance engineer, visually by means of written information and mapped points on a screen or electronically by means of issuing of a report, the intact or defective state of the monitored structures.

Figure 2:
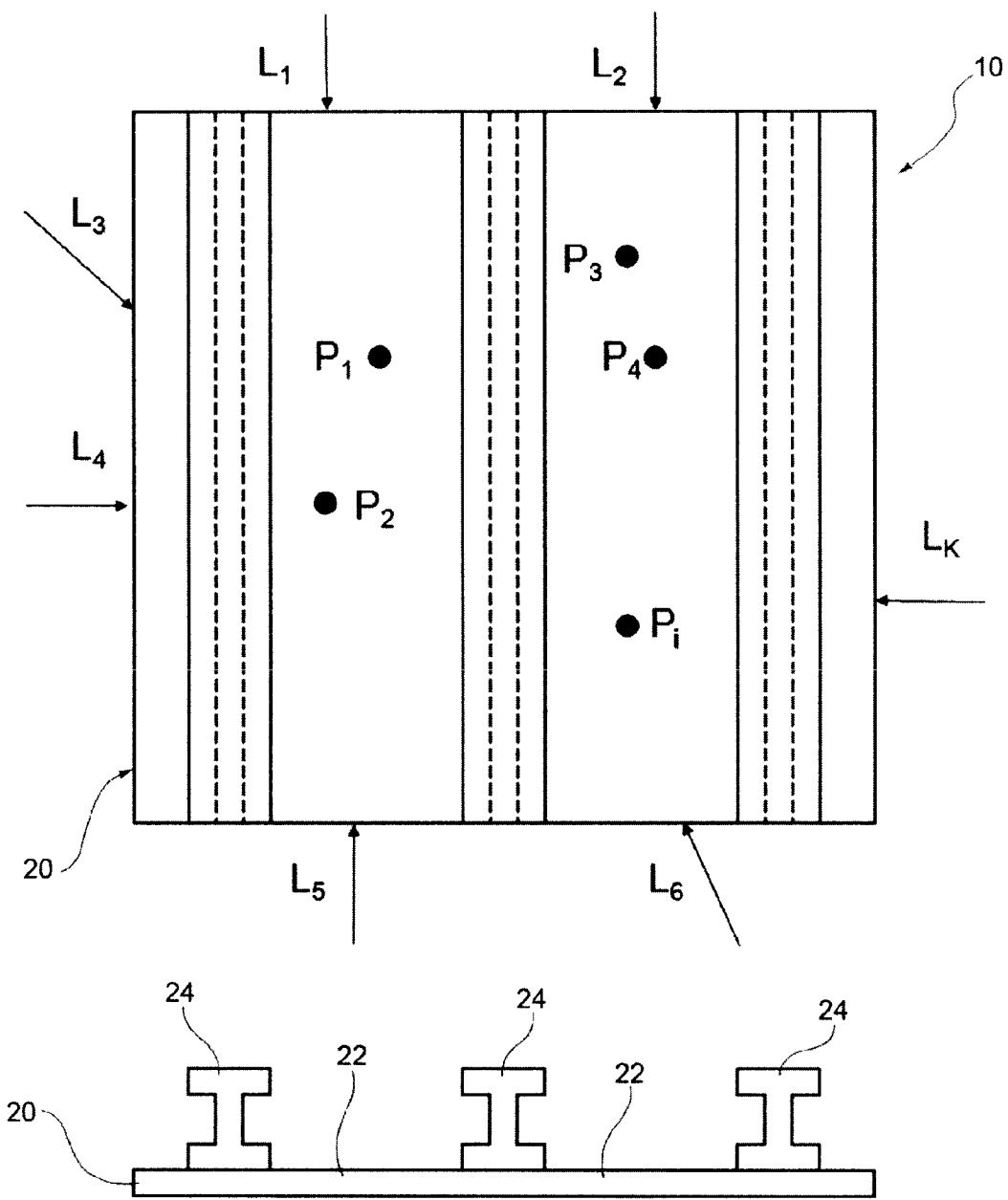
FIG. 2 shows an example of structure and a system of forces acting thereon.

An example of a structure being examined by a diagnostics system is shown in FIG. 2, in the form of a fuselage panel of an aircraft—denoted overall by 10 and shown in a top plan view and side view—which comprises a flat bottom element 20 which has on a surface 22 a series of reinforcing ribs 24.

$L_1$-$L_K$ indicate the vectors representing the forces acting on the structure (which is essentially two-dimensional) in a predetermined operating condition, by way of example and for the sake of simplicity having components only in the plane in which the structure lies.

$P_i$ denotes relevant points on the surface of the structure, which are typically chosen based on a criterion of substantial periodicity, except for any clustering in the vicinity of areas which are more critical from a structural point of view (for example, the skin/reinforcement bonding zone, in order to diagnose any possible detachment of the reinforcements).

Displacement sensors or meters of the type known per se are located in the N detection points (or relevant points of the structure) $P_i$; these sensors may consist, for example, of surface sensors or sensors which are embedded in the structure and which are connected (electrically, optically or wirelessly) to the processing unit of the diagnostics system on-board the aircraft designed to associate the signals acquired by the sensors with displacement values of the points of the structure associated thereto.

Known sensors may be, for example, mechanical or optical transducers, the latter preferably of interferometric type. In the case of mechanical displacement meters, they are generally made up of at least one mechanical element of variable length bound at one end to a support structure (reference system) and at the other end to the point where one wishes to measure the displacement. In order to obtain displacement measurements on all three coordinates, a complete measuring system requires the use of three mechanical elements, bound at different points, for each point where the displacement is to be measured or an element capable of measuring an elongation and at least two variations in angle with respect to the Cartesian reference axes of the hinge to which the gauge is bound on the fixed structure. In the case of optical deviation meters, the sensors include at least two video cameras and the arrangement on the observed surface of a suitable coloration, preferably in alternating color lines. As far as holographic systems are concerned, they are based on the identification of the position of the relevant points of the structure through the interference of two laser beams after a different path. They may allow very high precision, through strict vibration control.

Figure 3:
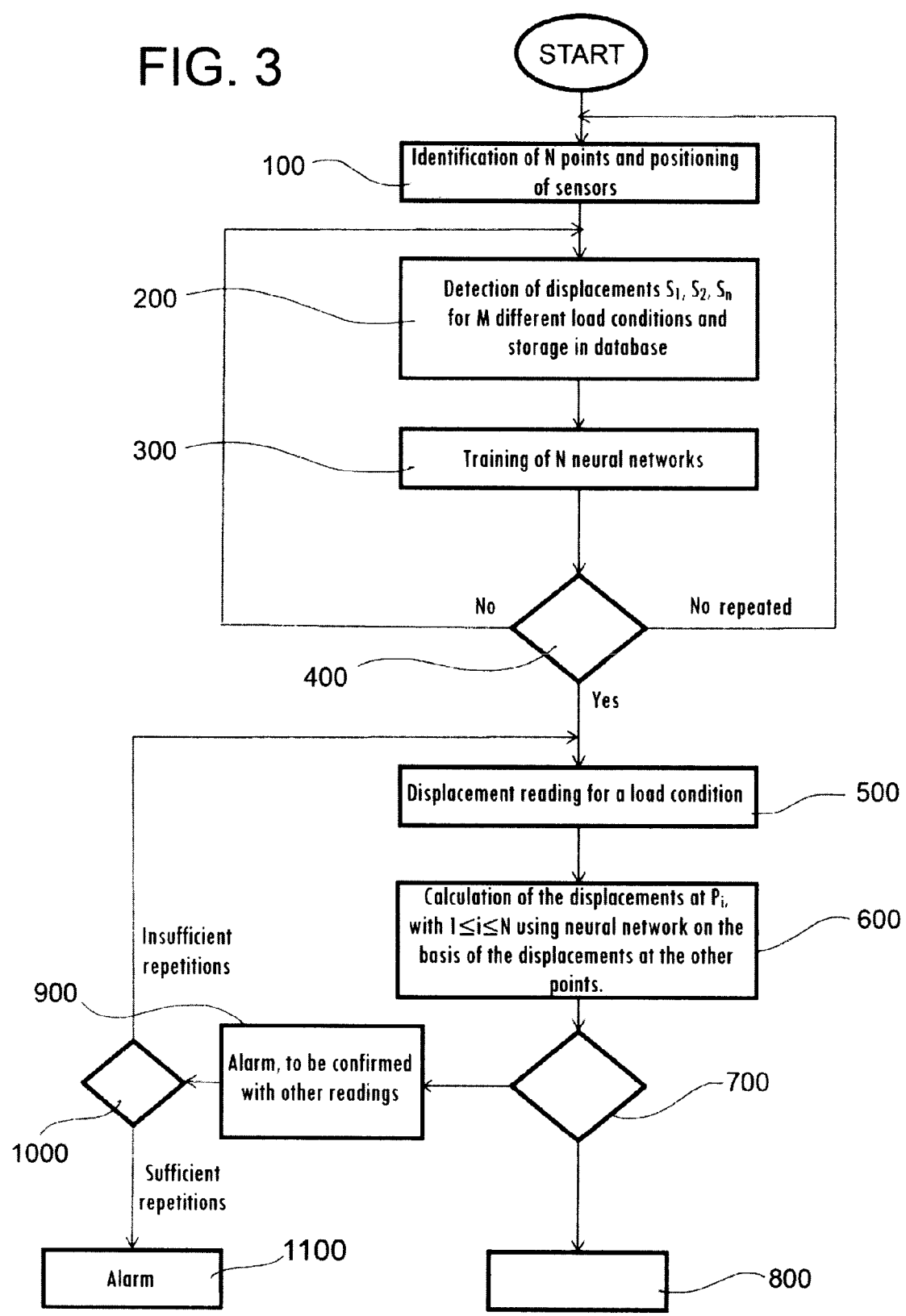
FIG. 3 is a flow diagram of the diagnostics method according to the invention.

The diagnostics method according to the invention is described in detail with reference to the flow diagram shown in FIG. 3. The diagnostics method is implemented by the on-board processing unit U designed to execute groups or modules of processing and calculation programs stored on a disk or accessible on the network, for performing the procedures described.

First of all, in step 100, the location of the relevant points on the structure is determined, and the structure displacement sensors are positioned at these points. The sensors may be located on the structure following determination of the topology of relevant points, or vice versa, using a network of pre-existing sensors on the structure a subset (or even the entire set) of corresponding relevant points is identified on the structure.

During a first step, for example by means of same on-board processing unit, and in a definitive manner (except for system updates), M state vectors $V_{Sj}=[S_{1j}, S_{2j}, \ldots, S_{Nj}]$ are acquired in step 200 for N relevant points and M different load conditions, with $1 \leq j \leq M$, which are stored in the database DB.

A state vector $V_S$ of the structure, with dimension N, is indicated as:

$$V_S = (S_1, S_2, \ldots, S_N)$$

where $S_1, \ldots, S_N$ each indicate, in abbreviated form, a value of the displacement (in certain cases the set of three values of the components of displacement in a pre-chosen Cartesian spatial reference system).

The vector $V_S$ may assume theoretically infinite values, in view of the infinite nature of the loads which may act on the structure in the different possible operating conditions, or in an infinite number of pluralities of rank-N relevant points of the structure, and with a plurality of possible intensity values.

For the purposes of the invention it is considered that each element of $V_S$ may assume a finite discrete number of values, for example owing to measurement discretization of the sensors which are employed on the structure.

In the currently preferred embodiment, for each load situation the processing unit U acquires N training displacement values $[S_{1j}, S_{2j}, \ldots, S_{Nj}]$, one for each relevant point $P_i$. For M different load conditions, the processing unit therefore acquires M displacement vectors, each of N points, corresponding to N×3 numerical values, since each vector has three components. The M vectors of N points are stored in the database DB.

Then, in step 300, a step for training the N neural networks is performed (one for each relevant point), setting for the neural network associated with the i-th point $P_i$ a condition of input values equal to the values of the displacement detected in the N−1 relevant points different from $P_i$ and stored in DB, and an output value representing the value of the displacement detected in the i-th relevant point $P_i$, which is also stored in DB. Each neural network creates an association between the displacements in N−1 points and the displacement in the relevant point $P_i$ with which it is associated, so that the processing unit has at its disposal N associative laws, of the type described above, for the value of the displacement of a point $P_i$ and each of the other N−1 points, for each value of i lying between 1 and N.

Each neural network is configured during a training step advantageously performed during the first operating step of the structure. For training purposes, preferably the data of M different load conditions are used, where M may be chosen depending on the number of coefficients C used by the neural network and should conveniently be at least five times the number of coefficients C in order to achieve satisfactory training.

In the case of a plurality of load conditions a comparison may be made, for each point, between the prediction of a displacement obtained by means of the neural network during training using as an input value the other N−1 displacements in the new load condition, and the one effectively detected at the point in this condition. With this approach it is possible to evaluate the degree of progress of training, which may be prolonged, if necessary, for further load conditions.

Advantageously, for effective training the relevant points are selected based on structural and statistical (variability) criteria.

At the end of the training procedure, operation of the neural networks may be verified in step 400 by comparing the output values envisaged by the trained network for given input values with the output values used during training, and assessing whether the difference, considered at a specific point and as an average, exceeds a fixed threshold and, in the case where incorrect operation is established (i.e. the difference exceeds, at a specific point and/or as an average, the fixed threshold of at least one or a predetermined minimum number thereof) the number of different load conditions to be used for performing detection of the displacement in the relevant points is increased, generating new training displacement vectors $[S_{1j}, S_{2j}, \ldots, S_{Nj}]$ which are stored in the database DB (step 200) and on which training of the neural networks (300) is carried out again.

In the case where the incorrect operation of at least one neural network or a predetermined minimum number of such networks is determined a number of times greater than a predetermined threshold, the topology of relevant points is modified (step 100), by means of the addition or replacement of points, and then the steps for acquiring M' training displacement vectors $[S_{1j}, S_{2j}, \ldots, S_{N'j}]$ for N' relevant points and M' different load conditions, storage thereof in the database DB and training of the N' neural networks are repeated in step 300. In the case where incorrect operation persists, in addition to prolonging the training period, it is possible to envisage modifying the number of levels and/or nodes per level of the neural network and/or modifying the function (function type) f and $\phi$.

If correct operation of the neural networks is established, the processing unit is configured to perform diagnostics of the structure, subject to any (for example periodic) updating of the displacement vectors, and corresponding new training of the neural networks, for example following modifications to the structure or aging thereof.

The operations for performing diagnostics of the structure are described below.

Assuming that for a given load or given plurality of loads there is a distribution of displacements $S_P$ in the grid of N relevant points $P_i$ of the structure, where $1 \leq i \leq N$, $(S_P)_q$ indicates a distribution of displacements in the grid induced by the same load or plurality of loads in the presence of a structural defect, and more generally $(S_P)_d$ indicates a distribution of displacements detected by the sensors.

At each instant, in step 500 the current displacement $(S_P)_d$ of the relevant points of the structure for a given current load condition is detected, for example the current displacement vector $[S_{1d}, \ldots S_{id}, \ldots, S_{Nd}]$.

Then, in step 600, for each point $P_i$, with $1 \leq i \leq N$ the value of the displacement $P'_i$ is calculated by means of the associated neural network previously trained, using inputs including the values of the displacement detected in the other points $(S_{1d}, \ldots, S_{(i-1)d}, S_{(i+1)d}, \ldots, S_{Nd})$.

Thereafter, in step 700, for each point and any load situation a comparison is carried out between the value of the displacement predicted by the neural network and the value of the displacement detected by the sensor. Specifically, the comparison between the value of the displacement $S_{id}$ detected at the point $P_i$ and the value of the displacement $S'_i$ calculated by the respective neural network in the same point is performed, repeating the comparison for each i, where 1<i<N.

An effective diagnostics evaluation is therefore performed by means of the comparison, at each point, between the expected local displacement of the structure and the one detected. Identification of defects in the structure is performed for those points where the detected local displacement of the structure differs from the expected state calculated by means of the respective neural network (namely there is a mismatch) beyond a predetermined percentage threshold.

If the outcome of the comparison is the recognition of a condition where there is a substantial match of the values, taking into account a predetermined tolerance, the diagnostics method concludes that the structure is intact (800), signaling this condition by means of a signaling unit D to an operator, such as the aircraft pilot or a maintenance engineer, visually by means of written information and mapped points on a screen or electronically by means of issuing of a report, so as to indicate the intact state of the structure monitored.

If the outcome of the comparison is the recognition of a condition where there is a substantial mismatch between the values, exceeding a predetermined tolerance, the diagnostics method interprets a possible defective condition of the structure (900). Consequently, the method repeats the step 500 for detecting the local displacement of the structure in the relevant points selected, during a successive instant, for the current load condition. It then repeats the step 600 for each point $P_i$, where 1<i<N, calculating the value of the displacement by means of the associated neural network previously trained and, finally, again in step 700, the comparison is made between the value of the displacement detected at the point $P_i$ and the value of the displacement calculated by the neural network at the same point, for each i, where 1<i<N.

The cycle of operations in steps 500-700 is repeated a predetermined number of times, checking whether a predetermined number of repetitions in the comparison step 1000 have been reached, unless a condition where there is substantial match between the values, and therefore an intact condition of the structure, is definitively recognized.

If in the comparison step 1000 it is determined that the predetermined number of repetitions has been reached and the indication of a defective state of the structure remains, a signal (1100) is emitted, by means of the signaling unit D, to an operator, such as the aircraft pilot or a maintenance engineer, visually in the form of written information and mapped points on a screen or electronically by means of issuing of a report, so as to indicate the defective state of the monitored structure and its location (namely, identification of the point $P_i$ where there is no match between the value of the displacement detected and the value of the displacement calculated by the neural network).

The diagnostics evaluation may be further verified by considering different load situations and therefore measurements of the local displacement of the structure: if the mismatch is repeated for different load conditions, this may be interpreted as a confirmation of the presence of damage or a defect in the structure which induces a variation in the predicted displacement. If the mismatch is not repeated, this may be interpreted as being an occasional or spurious signal, not caused by real physical factors.

The diagnostics evaluation described above is performed for each relevant point of the structure. Mapping of the points where the presence of damage or a defect in the structure is determined provides an indication of the extent of the damage. For example, determination of damage or a defect in various adjacent points is an indication of a delaminated area.

Obviously, as will be clear to a person skilled in the art, the method concluded as illustrated in the flow diagram shown in the figure may be cyclically repeated, for example at predetermined periodic intervals in accordance with a predetermined monitoring program.

Advantageously, in order to allow operation of the system also in the case of damage to the structure in the vicinity of some of the detection points, i.e. where there is damage to the sensors, a surplus is created by increasing the number of relevant detection points so as to have a certain number of additional backup sensors.

The method and system object of the invention make it advantageously possible to identify damage in aeronautical structures, with increased safety, reduced maintenance costs and the creation of less conservative designs and therefore lighter structures.

Obviously, without affecting the principle of the invention, the embodiments and the constructional details may be greatly modified with respect to that described and illustrated purely by way of a non-limiting example, without thereby departing from the scope of the invention as defined in the accompanying claims.

What is claimed is:

1. Method for diagnosing a structure subjected to loads, in particular an aircraft structure, through a sensory arrangement associated with said structure and adapted to detect at least one local displacement of the structure, which comprises a matrix of sensors arranged in relevant points of the structure, each of which is capable of detecting a physical quantity indicative of the local displacement of the structure and to emit a respective electrical response signal correlated to the value assumed by said quantity, the method comprising, in a learning phase:

(a) from a plurality of training data indicative of the local displacement of the structure at a plurality of relevant sensing points by association with at least one load condition, establishing an associative relationship between the values of the local displacement of the structure in a subset of said plurality of relevant sensing points and the values of the local displacement of the structure in at least one residual relevant sensing point; and in an operational phase:

(b) detecting the values assumed by the local displacement of the structure in a plurality of relevant sensing points in said at least one load condition;

(c) on the basis of the pre-established association relationship, starting from the values assumed by the local displacement of the structure in a subset of said plurality of sensing points, estimating the values of the local displacement in at least one residual sensing point;

(d) comparing with each other the estimated and detected values of the local displacement in said at least one residual sensing point; and (e) determining a state of integrity of the structure if the detected and estimated local displacement values substantially match except for predetermined tolerances, or determining a defect state of the structure if said values of the local displacement are different except for the predetermined tolerances.

2. Method according to claim 1, wherein the comparison between the estimated values and the detected values of the local displacement is performed for each relevant sensing point.

3. Method according to claim 1, wherein said learning phase and said operational phase are performed in a plurality of different loading conditions, whereby a defect state of the structure is determined on the basis of the existence of a condition of discrepancy between the estimated and detected values of the local displacement in a multiplicity of load situations, while an episodic indication is determined on the basis of the existence of a condition of discordance between the estimated and detected values of the local displacement in a single load situation or in a number of load situations below a threshold.

4. Method according to claim 1, wherein the learning phase includes the collection of a plurality of training data in the form of vectors comprising the local displacement values detected at the relevant points, in at least one load condition.

5. Method according to claim 1, wherein a plurality of neural networks is respectively associated with said relevant points and the learning phase comprises, for each neural network, the determination of an associative relationship between the values of the local displacement of the structure in at least one load condition at the relevant sensing point corresponding to said network and the values of the local displacement in the remaining plurality of relevant sensing points.

6. Method according to claim 5, wherein the learning phase comprises, in the case of a plurality of load conditions, a comparison between the value of the local displacement estimated through the neural network during training in at least one relevant point and the value of the local displacement in said at least one relevant point, in a condition of new load.

7. Method according to claim 6, comprising the check of the learning of the neural networks by comparing the value of the local displacement, estimated in at least one residual relevant point starting from training data indicative of the local displacement of the structure at a subset of said plurality of relevant sensing points, and the training value of the local displacement at said residual relevant point, the learning being considered complete if the difference between the aforementioned values is lower than a pre-set threshold, or unsatisfactory otherwise, whereby the number of different load conditions in which the learning phase is performed is increased, or the topology of the relevant points is modified, or even at least one out of the number of levels, the number of nodes per level and a characteristic function of the neural networks is changed.

8. Method according to claim 1, in which a defect state of the structure is determined if said values of the local displacement are different except for the predetermined tolerances after a temporal succession of a predetermined number of iterations of operations (b), (c), (d).

9. Method according to claim 1, characterized in that it is repeated at predetermined periodic intervals according to a pre-established check plan.

10. Method according to claim 1, wherein a mapping of the relevant points in which the defect of the structure is estimated is interpreted as indicating the extent of said defect.

11. Method according to claim 1, wherein said relevant sensing points are selected with a criterion of periodicity, without prejudice to an intensification near areas of greater structural criticality.

12. System for diagnosing a structure subject to loads, in particular an aircraft structure, comprising:
a sensory arrangement associated with said structure and adapted to detect at least one local displacement of the structure, which comprises a matrix of sensors placed in relevant points of the structure, each of which is capable of detecting a physical quantity indicative of the local displacement of the structure and of emitting a respective electrical response signal correlated to the value assumed by said quantity; and
electronic learning processing means, of the neural network type, arranged to perform a method comprising,
in a learning phase:
(a) from a plurality of training data indicative of the local displacement of the structure at a plurality of relevant sensing points by association with at least one load condition, establishing an associative relationship between the values of the local displacement of the structure in a subset of said plurality of relevant sensing points and the values of the local displacement of the structure in at least one residual relevant sensing point; and
in an operational phase:
(b) detecting the values assumed by the local displacement of the structure in a plurality of relevant sensing points in said at least one load condition;
(c) on the basis of the pre-established association relationship, starting from the values assumed by the local displacement of the structure in a subset of said plurality of sensing points, estimating the values of the local displacement in at least one residual sensing point;
(d) comparing with each other the estimated and detected values of the local displacement in said at least one residual sensing point; and
(e) determining a state of integrity of the structure if the detected and estimated local displacement values substantially match except for predetermined tolerances, or determining a defect state of the structure if said values of the local displacement are different except for the predetermined tolerances.

13. System according to claim 12, wherein said processing means comprise a plurality of neural networks respectively associated to said relevant points, in which each neural network is a Q-level network, with $d_Q$ nodes by level, for each node being defined a respective correlation parameter C, a cross correlation function $\phi$ associating to each pair of correlation parameters $C_a$, $C_b$ a cross correlation parameter K, with $K_{a,b}=\phi(C_a, C_b)$, a hyperbolic function determining a correlation between each node of a level $X_{i+1,j}$ and the nodes of the previous level $X_{i,j}$ as a function of said cross correlation parameter, as:

$$X_{i+1,j}=f((x_{i,1},K_{(i,1),(i+1,j)}),(x_{i,2},K_{(i,2),(i+1,j)}), \ldots , (x_{i,N},K_{(i,N),(i+1,j)})),$$

a network training including the determination of C parameters that minimize the difference between the calculated output value and its actual value.

14. System according to claim 12, wherein said processing means are connected to a signaling unit, adapted to represent to an operator the state of integrity or defectiveness of the monitored structures.

15. System according to claim 12, wherein said sensing sensors include sensors of the local displacement of the structure.

16. Processing program or group of programs executable by a processing system, comprising one or more code modules for implementing a method for diagnosing a structure subjected to loads, in particular an aircraft structure, through a sensory arrangement associated with said structure and adapted to detect at least one local displacement of the structure, which comprises a matrix of sensors arranged in relevant points of the structure, each of which is capable of detecting a physical quantity indicative of the local displacement of the structure and to emit a respective electrical response signal correlated to the value assumed by said quantity, the method comprising, in a learning phase:

(a) from a plurality of training data indicative of the local displacement of the structure at a plurality of relevant sensing points by association with at least one load condition, establishing an associative relationship between the values of the local displacement of the structure in a subset of said plurality of relevant sensing points and the values of the local displacement of the structure in at least one residual relevant sensing point; and in an operational phase:

(b) detecting the values assumed by the local displacement of the structure in a plurality of relevant sensing points in said at least one load condition;

(c) on the basis of the pre-established association relationship, starting from the values assumed by the local displacement of the structure in a subset of said plurality of sensing points, estimating the values of the local displacement in at least one residual sensing point;

(d) comparing with each other the estimated and detected values of the local displacement in said at least one residual sensing point; and (e) determining a state of integrity of the structure if the detected and estimated local displacement values substantially match except for predetermined tolerances, or determining a defect state of the structure if said values of the local displacement are different except for the predetermined tolerances.

* * * * *